United States Patent
Hisada et al.

(10) Patent No.: US 11,577,788 B2
(45) Date of Patent: Feb. 14, 2023

(54) JOINING STRUCTURE OF VEHICLE STEEL PLATES AND JOINING METHOD FOR VEHICLE STEEL PLATES

(71) Applicant: Toyota Jidosha Kabushiki Kaisha, Toyota (JP)

(72) Inventors: Kohei Hisada, Nagoya (JP); Hiroki Sugino, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 440 days.

(21) Appl. No.: 16/731,804

(22) Filed: Dec. 31, 2019

(65) Prior Publication Data

US 2020/0223494 A1  Jul. 16, 2020

(30) Foreign Application Priority Data

Jan. 11, 2019 (JP) ............................. JP2019-003838

(51) Int. Cl.
| | |
|---|---|
| *B62D 27/02* | (2006.01) |
| *B23K 9/007* | (2006.01) |
| *F16B 5/08* | (2006.01) |
| *B62D 25/04* | (2006.01) |
| *B62D 29/00* | (2006.01) |

(52) U.S. Cl.
CPC ............ *B62D 27/023* (2013.01); *B23K 9/007* (2013.01); *B62D 25/04* (2013.01); *F16B 5/08* (2013.01); *B62D 29/007* (2013.01)

(58) Field of Classification Search
CPC ........ B62D 27/023; B62D 25/04; B23K 9/07; B23K 11/115; B63K 9/007

USPC ........................................................... 296/29
See application file for complete search history.

(56) References Cited

U.S. PATENT DOCUMENTS

| | | | |
|---|---|---|---|
| 2015/0174702 A1 | 6/2015 | Fujimoto et al. | |
| 2015/0360725 A1 | 12/2015 | Yoshida | |
| 2018/0361508 A1 | 12/2018 | Kawakita et al. | |
| 2019/0276088 A1 | 9/2019 | Onishi et al. | |

FOREIGN PATENT DOCUMENTS

| | | | | |
|---|---|---|---|---|
| CN | 108860323 A | * | 11/2018 | ............. B62D 25/04 |
| CN | 110228534 A | | 9/2019 | |
| JP | 2006075863 A | * | 3/2006 | ........... B21D 26/059 |
| JP | 2010-264503 A | | 11/2010 | |
| JP | 2015-171731 A | | 10/2015 | |
| JP | 2019-000906 A | | 1/2019 | |
| WO | 2012/070132 A1 | | 5/2012 | |

* cited by examiner

*Primary Examiner* — Dennis H Pedder
(74) *Attorney, Agent, or Firm* — Dinsmore & Shohl LLP

(57) ABSTRACT

In a vehicle to which the present joining structure of vehicle steel plates is applied, a third welded portion is set between a first welded portion and a second welded portion, wherein at the first welded portion, a pillar outer rear flange, an SM outer rear flange, a pillar inner rear flange are joined to one another; and at the second welded portion, the pillar outer rear flange and the pillar inner rear flange are joined to each other. At the third welded portion, the pillar outer rear flange and the SM outer rear flange are joined to each other. Accordingly, a tensile load F acting on the pillar outer rear flange is distributed toward the SM outer rear flange side.

5 Claims, 3 Drawing Sheets

60 SECOND WELDED PORTION
62 THIRD WELDED PORTION

32 B PILLAR OUTER PANEL (FIRST STEEL PLATE)
34 B PILLAR INNER PANEL (SECOND STEEL PLATE)
56 FIRST WELDED PORTION

60 SECOND WELDED PORTION
62 THIRD WELDED PORTION

JOINING STRUCTURE OF VEHICLE STEEL PLATES AND JOINING METHOD FOR VEHICLE STEEL PLATES

CROSS-REFERENCE TO RELATED APPLICATIONS

This application claims priority to Japanese Patent Application No. 2019-003838 filed on Jan. 11, 2019, which is incorporated herein by reference in its entirety including the specification, drawings and abstract.

BACKGROUND

1. Technical Field

The present disclosure relates to a joining structure of vehicle steel plates that joins vehicle steel plates by welding and a joining method for vehicle steel plates.

2. Description of Related Art

Japanese Patent Application Publication No. 2010-264503 discloses a configuration in which three steel plates disposed to overlap each other in the thickness direction are joined by spot-welding and laser-welding. In the meantime, when steel plates are welded, the steel plates may experience change in structure to become different from that of the base materials due to influence of heat of the welding, even though melting by the welding does not occur in the vicinity of the welded portions of the steel plates. Thus, the portions that have experienced change in structure to become different from that of the base materials due to the influence of heat of the welding has a lower impact resistance than that of the base materials.

SUMMARY

In consideration of the above fact, an object of the present disclosure is to provide a joining structure of vehicle steel plates and a joining method for vehicle steel plates capable of reducing occurrence of breakage or the like due to impact, etc., in the vicinity of a first welded portion where a first steel plate and a second steel plate are welded.

A joining structure of vehicle steel plates of a first aspect, includes: a first steel plate; a second steel plate disposed to be stacked on the first steel plate on one side in a thickness direction of the first steel plate; a third steel plate disposed to be stacked on the first steel plate on the other side in the thickness direction of the first steel plate; a first welded portion at which at least the first steel plate and the second steel plate are welded to each other; a second welded portion provided on a side of the first welded portion, the first steel plate being welded to only the second steel plate at the second welded portion; and a third welded portion provided between the first welded portion and the second welded portion, the first steel plate being welded to only the third steel plate at the third welded portion.

In the joining structure of vehicle steel plates of the first aspect, at least the first steel plate and the second steel plate are welded at the first welded portion, and also in the second welded portion set on the side of the first welded portion, the first steel plate is welded only to the second steel plate.

Here, the third welded portion is provided between the first welded portion and the second welded portion, and the first steel plate is welded only to the third steel plate at the third welded portion. Hence, when the first steel plate is pulled toward the second welded portion with respect to the first welded portion, a tensile load is transmitted from the third welded portion to the third steel plate. In this manner, the tensile load is transmitted to the third steer plate, whereby a load can be prevented from being concentrated on the vicinity of the first welded portion in the first steel plate.

The joining structure of vehicle steel plates of a second aspect is configured such that, in the joining structure of vehicle steel plates of the first aspect, the first steel plate has a tensile strength of 980 MPa or more.

In the joining structure of vehicle steel plates according to the second aspect, the first steel plate has a tensile strength of 980 MPa or more. Meanwhile, when welding is applied on a steel sheet having such a high tensile strength, a portion that is not melted but is affected by the heat of welding, that is, a so-called "heat-affected zone (heat-affected zone: commonly referred to as "HAZ")" is formed on the side of the portion that is melted by welding. Even if the tensile strength of the base material is 980 MPa or more, the heat-affected zone may be lower in tensile load than the base material is. Here, the tensile load acting on the first steel plate is transmitted to the third steel plate via the third welded portion, and thus concentration of the load on the vicinity of the first weld portion in the first steel plate is suppressed, to thereby suppress occurrence of breakage, etc. in the heat affected zone of the first steel plate near the first welded portion.

The joining structure of vehicle steel plates of a third aspect is configured such that, in the joining structure of vehicle steel plates of the first aspect or the second aspect, the first welded portion, the second welded portion, and the third welded portion are arranged side by side in a longitudinal direction of the first steel plate and the second steel plate.

In the joining structure of vehicle steel plates of the third aspect, the first welded portion, the second welded portion, and the third welded portion are each arranged side by side along with the longitudinal direction of the first steel plate and the second steel plate. Therefore, when the portion of the first welded portion of the first steel plate is pulled outward in the longitudinal direction of the first steel plate and the second steel plate by the axial force along the longitudinal direction of the first steel plate and the second steel plate, it is possible to suppress a load from concentrating on the vicinity part of the first welded portion.

The joining structure of vehicle steel plates of a fourth aspect is configured such that, in the joining structure of vehicle steel plates of the third aspect, the first steel plate and the second steel plate configure a vehicle structural member having a closed cross-sectional shape obtained by cutting the first steel plate and the second steel plate along a direction orthogonal to the longitudinal direction of the first steel plate and the second steel plate.

In the joining structure of vehicle steel plates of the fourth aspect, the vehicle structural member having to closed cross-sectional shape is configured by the first steel plate and the second steel plate. Here, since the occurrence of breakage of the first steel plate at the first welded portion due to the axial force along the longitudinal direction of the first steel plate and the second steel plate is suppressed, occurrence of the cress-sectional collapse etc. of the vehicle structural member resulting from the breakage etc. in the first welded portion of such a first steel plate is suppressed.

A joining method for vehicle steel plates of a fifth aspect, includes: a second steel plate welding process that spot-welds a second steel plate disposed on one side in a thickness direction of a first steel plate at a first welded portion, the spot-welding being performed on the first steel plate, and spot-welds the second steel plate at a second welded portion set on a side of the first welded portion, the spot-welding being performed on the first steel plate; and a third steel plate welding process being performed before the second steel plate welding process, the third steel plate welding process spot-welding a third steel plate disposed on the other side in the thickness direction of the first steel plate at a third welded portion set between the first welded portion and the second welded portion, the spot-welding being performed on the first steel plate.

In the joining method for vehicle steel plates of the fifth aspect, the second steel plate disposed on one side in the thickness direction of the first steel plate is welded to the first steel plate by spot-welding in the second steel plate welding process. Moreover, the third steel plate disposed on the other side of the thickness direction of the first steel plate is welded to the first steel plate by spot-welding in the third steel plate welding process. Here, the second steel plate is welded to the first steel plate at the first welded portion and the second welded portion set on the side of the first welded portion, and the third steel plate is welded to the first steel plate at the third welded portion between the first welded portion and the second welded portion. Therefore, when the first steel plate is pulled toward the second welded portion with respect to the first welded portion, the tensile load is transmitted from the third welded portion to the third steel plate. As described above, as the tensile load is transmitted to the third steel plate, the load can be prevented from being concentrated on the vicinity of the first welded portion in the first steel plate.

As described above, in the joining structure of vehicle steel plates of the first aspect, since the load can be suppressed from being concentrated on the vicinity of the first welded portion of the first steel plate, it is possible to suppress breakage or the like from occurring in the first steel plate at the first welded portion.

In the joining structure of vehicle steel plates of the second aspect, it is possible to suppress breakage or the like from occurring in the heat affected zone of the first steel plate near the first welded portion.

In the joining structure of vehicle steel plates of the third aspect, it is possible to suppress breakage or the like from occurring in the first steel plate at the first welded portion by the axial force along the longitudinal direction of the first steel plate and the second steel plate.

In the joining structure of vehicle steel plates of the fourth aspect, since occurrence of a cross-sectional collapse of the vehicle structural member due to breakage or the like at the first welded portion of the first steel plate is suppressed, it is possible to fully utilize ability of the vehicle structural member such as transmission of a collision load by the vehicle structural member and absorption of the collision load due to deformation of the vehicle structural member.

In the joining method for vehicle steel plates of the fifth aspect, since the load can be suppressed from being concentrated on the vicinity of the first welded portion of the first steel plate, it is possible to suppress breakage or the like from occurring in the first steel plate at the first welded portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
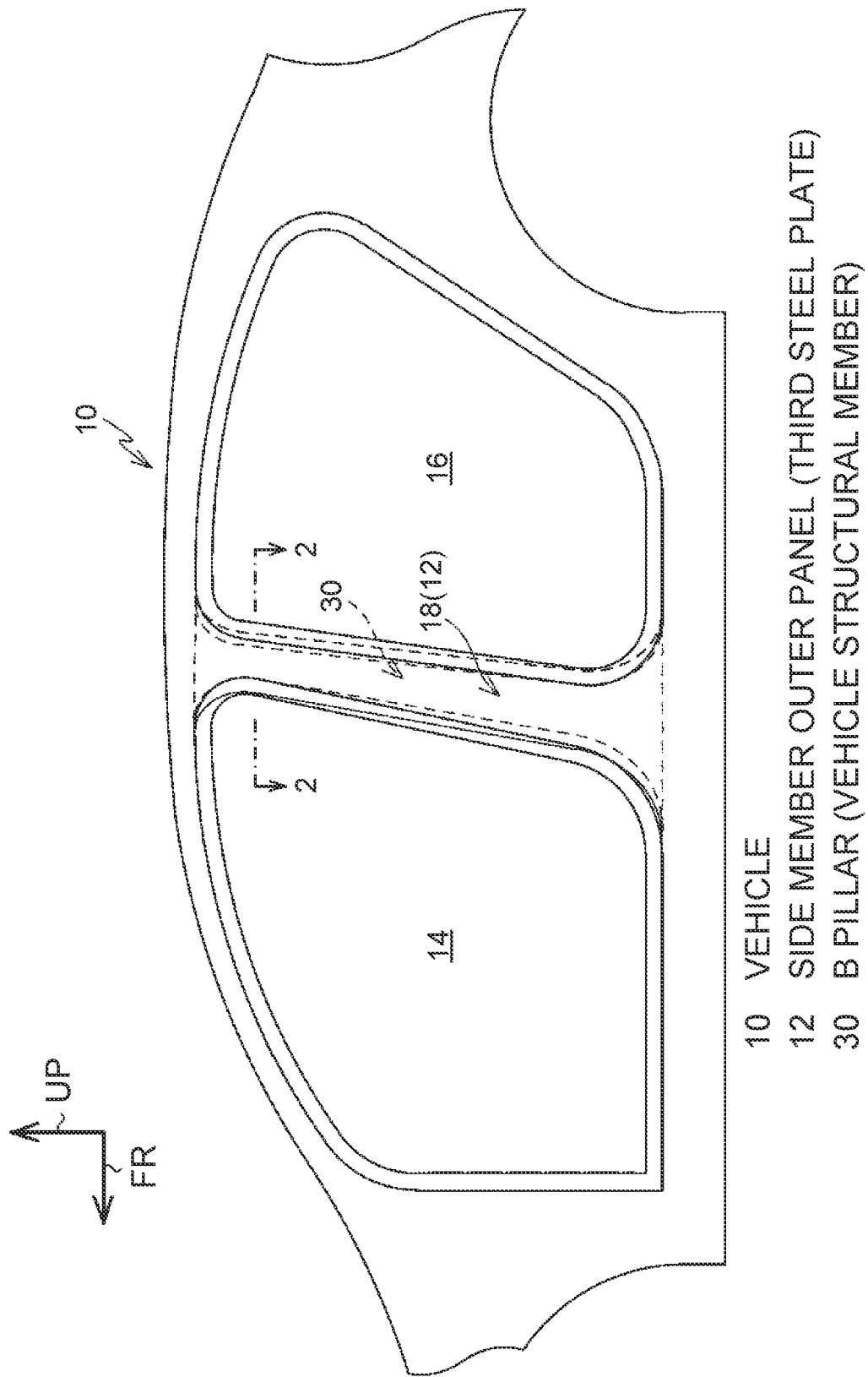
FIG. 1 is a side view of a side member outer panel of a vehicle to which a first embodiment is applied, as viewed from the outer side in the vehicle width direction (left side in the vehicle width direction)

Next, each embodiment of the present disclosure be described with reference to FIG. 1 to FIG. 5. Note that, in each of the drawings, an arrow FR indicates the front side (vehicle front side) of a vehicle 10 to which a joining structure of vehicle steel plates according to each embodiment is applied, and an arrow OUT indicates the outer side in the vehicle width direction, and an arrow UP indicates the vehicle upper side. In each of the following embodiments, the left side in the vehicle width direction is described as the outer side in the vehicle width direction, and the right side in the vehicle width direction is described as the inner side in the vehicle width direction; however, the right side in the vehicle width direction may be defined as the outer side in the vehicle width direction, and the left side in the vehicle width direction may be defined as the inner side in the vehicle width direction.

Furthermore, in the following description on each of the embodiments, including a first embodiment, components basically the same as those in the previous embodiment or embodiments will be given the same reference numerals and detailed description thereof will be omitted.

Configuration of First Embodiment

As shown in FIG. 1, the vehicle 10 to which the present embodiment is applied includes a side member outer panel 12 (hereinafter, the side member outer panel 12 is simply referred to as an "SM outer 12") as a third steel plate. The SM outer 12 is formed, for example, by press-forming a hot dip galvanized steel plate having a thickness of 0.65 mm, and configures an outer panel in the vehicle width direction of the vehicle 10.

Figure 2:
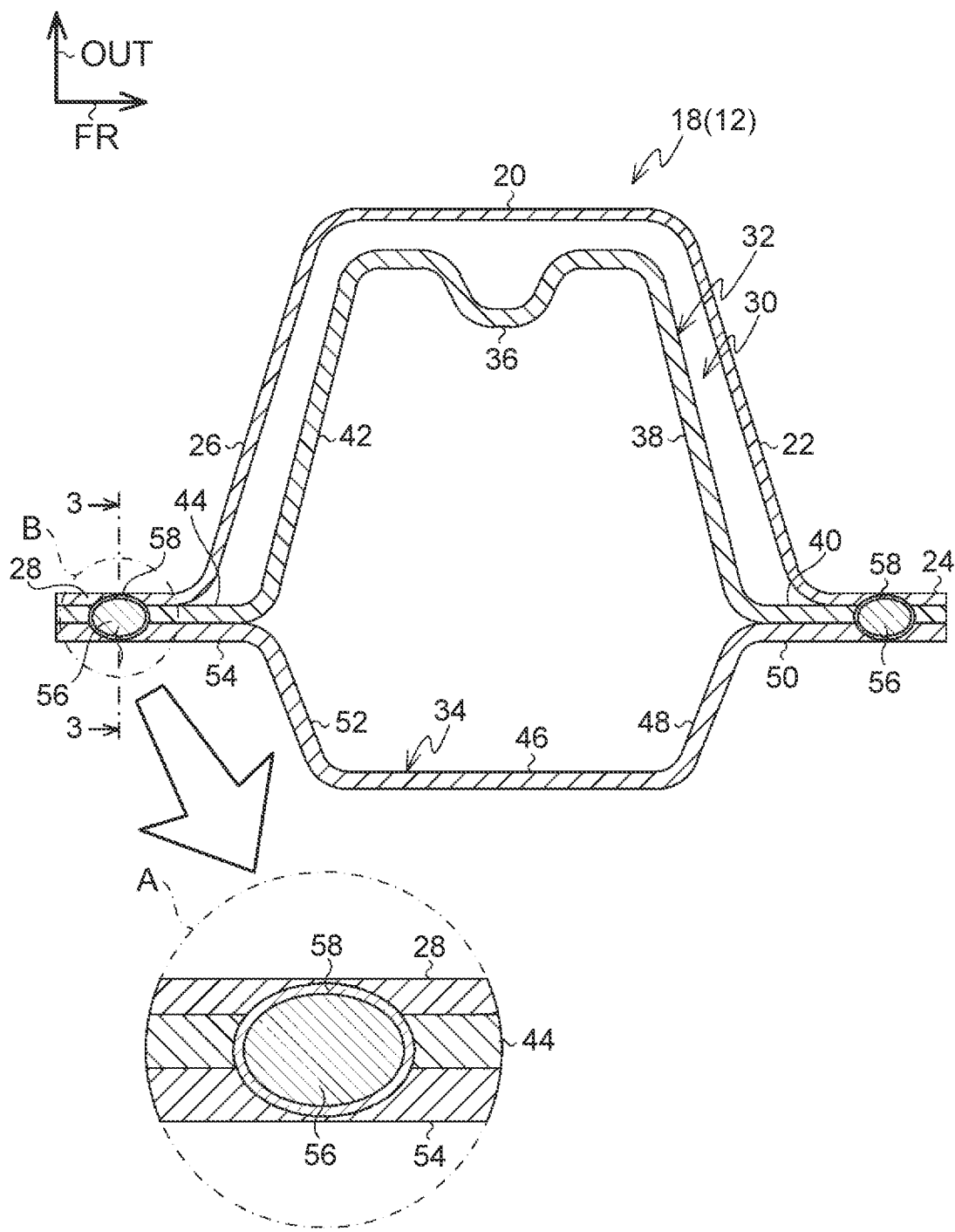
FIG. 2 is a sectional view of an SM outer intermediate portion and a B pillar of the side member outer panel, taken along line 2-2 in FIG. 1.

The SM outer 12 is formed with a front opening 14 and a rear opening 16. The front opening 14 is provided with a front door, and the rear opening 16 is provided with a rear door. A part of the SM outer 12 between the front opening 14 and the rear opening 16 is defined as an SM outer intermediate portion 18. The SM outer intermediate portion 18 is generally set to be longer in the vehicle-height direction. As shown in FIG. 2, the SM outer intermediate portion 18 includes an SM outer bottom wall portion 20.

The width direction of the SM outer bottom wall portion 20 is configured to be generally the vehicle front-rear direction. An SM outer front wall portion 22 extends from a vehicle front end of the SM outer bottom wall portion 20 toward the inner side in the vehicle width direction. In addition, an SM outer front flange 24 extends toward the vehicle front side from an, inner end in the vehicle width direction of the SM outer front wall portion 22 (an end opposite to the SM outer bottom wall portion 20).

An SM outer rear wall portion 26 extends from a vehicle rear end of the SM outer bottom wall portion 20 toward the inner side in the vehicle width direction. Further, SM outer rear flange 28 extends toward the vehicle rear side from an inner end in the vehicle width direction of the SM outer rear wall portion 26 (an end opposite to the SM outer bottom wall portion 20). Hence, the cross-sectional shape of the SM outer intermediate portion 18 obtained by cutting the SM outer intermediate portion 18 in a direction orthogonal to its longitudinal direction (the vehicle-height direction) is formed in a hat-like shape that opens inward in the vehicle width direction.

A B pillar 30 as a vehicle structural member is disposed on the inner side of the SM outer intermediate portion 18 in the vehicle width direction. The B pillar 30 includes: a B outer panel 32 (hereinafter, the B pillar outer panel 32 is simply referred to as a "pillar outer 32") as a first steel plate; and a B pillar inner panel 34 (hereinafter, the B pillar inner panel 34 is simply referred to as a "pillar inner 34") as a second steel plate 34.

The pillar outer 32 is formed of a steel plate having a higher tensile strength than that of the SM outer 12 as the third steel plate. The steel plate forming the SM outer 12 is formed, for example, by press-forming a steel plate having a thickness of 2 mm heated to 900° C. or higher, using a die. Further, the press-formed steel plate is contact-cooled by a press-forming die (that is, the SM outer 12 is formed by hot-stamping), and a tensile strength of the pillar outer 32 is set to be 1500 MPa or more. Other than the hot-stamping, the pillar outer 32 can also be produced by forming an ultra-high strength steel plate, for example. Further, the tensile strength of the pillar outer 32 may be set at any value of 980 MPa or more.

The pillar outer 32 is formed to be generally longer in the vehicle-height direction. Further, the pillar outer 32 includes a pillar outer bottom wall portion 36. The width direction of the pillar outer bottom wall portion 36 is set to be generally the vehicle front-rear direction. From a vehicle front end of the pillar outer bottom wall portion 36, a pillar outer front wall portion 38 extends inward in the vehicle width direction. Further, a pillar outer front flange 40 extends vehicle-frontward from an inner end in the vehicle width direction of the pillar outer front wall portion 38 (an opposite end to the pillar outer bottom wall portion 36).

A pillar outer rear wall portion 42 extends inward in the vehicle width direction from a vehicle rear end of the pillar outer bottom wall portion 36. Further, a pillar outer rear flange 44 extends vehicle-rearward from an inner end in the vehicle width direction of the pillar outer rear wall portion 42 (an opposite end to the pillar outer bottom wall portion 36). Hence, the cross-sectional shape of the pillar outer 32 obtained by cutting the pillar outer 32 in a direction orthogonal to the longitudinal direction (the vehicle-height direction) is formed in a hat-like shape opening inward in the vehicle width direction.

On the other hand, the pillar inner 34 is formed by press-forming a steel plate having a higher tensile strength than that of the SM outer 12 as the third steel plate and having a lower tensile strength than that of the pillar outer 32 as the first steel plate, that is, a hot-dip galvanized steel plate with a thickness of 1.4 mm, for example. The longitudinal direction of the pillar inner 34 is generally the vehicle-height direction. The pillar inner 34 includes a pillar inner bottom wall portion 46. The width direction of the pillar inner bottom wall portion 46 is generally the vehicle front-rear direction. From a vehicle front end of the pillar inner bottom wall portion 46, a pillar inner front wall portion 48 extends outward in the vehicle width direction. Further, a pillar inner front flange 50 extends vehicle-frontward from an outer end in the vehicle width direction of the pillar inner front wall portion 48 (an opposite end to the pillar inner bottom wall portion 46).

From a vehicle rear end of the pillar inner bottom wall portion 46, a pillar inner rear wall portion 52 extends outward in the vehicle width direction. From an outer end in the vehicle width direction of the pillar inner rear wall portion 52 (an opposite end to the pillar inner bottom wall portion 46), a pillar inner rear flange 54 extends vehicle-rearward. Hence, the cross-sectional shape of the pillar inner 34 obtained by cutting the pillar inner 34 in a direction orthogonal to its longitudinal direction (the vehicle-height direction) is formed in a hat-like shape opening outward in the vehicle width direction.

Further, as shown in FIG. 2, the pillar outer front flange 40 of the pillar outer 32 is disposed inward in the vehicle width direction of the SM outer front flange 24 of the SM outer intermediate portion 18. In addition, the pillar inner front flange 50 of the pillar inner 34 is disposed inward in the vehicle width direction of the pillar outer front flange 40. The SM outer front flange 24, the pillar outer front flange 40, and the pillar inner front flange 50 are disposed to overlap each other in their thickness direction.

On the other hand, the pillar outer rear flange 44 of the pillar outer 32 is disposed inward in the vehicle width direction of the SM outer rear flange 28 of the SM outer intermediate portion 18. Further, a pillar inner rear flange 54 of the pillar inner 34 is disposed inward in the vehicle width direction of the pillar outer rear flange 44. The SM outer rear flange 28, the pillar outer rear flange 44, and the pillar inner rear flange 54 overlap each other in their thickness direction.

Figure 3:
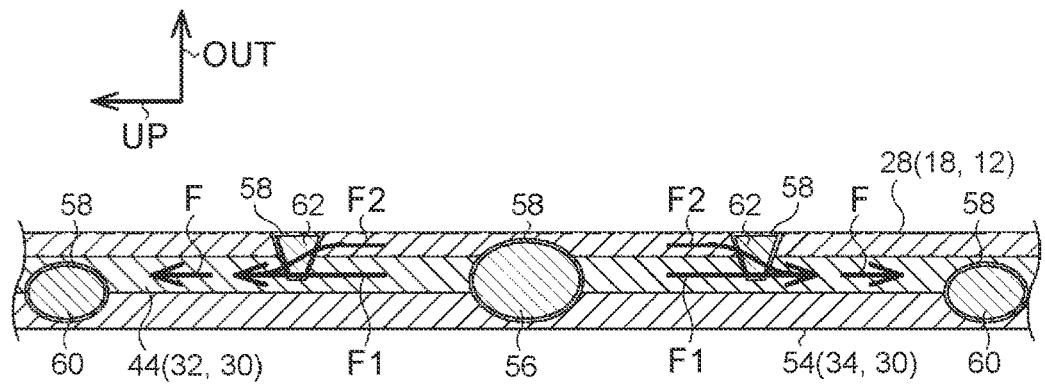
FIG. 3 is a sectional view of an SM outer rear flange of the side member outer panel, a pillar outer rear flange of the B pillar, and a pillar inner rear flange of the B pillar, taken along line 3-3 in FIG. 2.

Further, as shown in FIG. 3, the pillar outer rear flange 44 is joined to both the SM outer rear flange 28 and the pillar inner rear flange 54 at, each first welded portion 56 of interest. Each first welded portion 56 is defined as a spot formed when spot-welding is performed in a state in which three sheets of the SM outer rear flange 28, the pillar outer rear flange 44, and the pillar inner rear flange 54 are stacked. Each first welded portion 56 is formed by partially heating and melting the respective SM outer rear flange 28, pillar outer rear flange 44, and pillar inner rear flange 54, and then further cooling and hardening them.

In addition, as indicated by a dashed-dotted line circle A that is an enlarged view of a dashed-dotted line circle B in FIG. 2, a heat affected zone 58 is formed around the first welded portion 56. The heat affected zone 58 is a portion that is not melted during the spot-welding the each first welded portion 56 but is affected by heat of the spot-welding. As a result, for example, a portion of the SM outer rear flange 28 in the heat affected zone 58 has a strength (for example, a tensile strength) lower than that of the base material of the SM outer 12.

Moreover, as shown in FIG. 3, the pillar outer rear flange 44 is joined to the pillar inner rear flange 54 at second welded portions 60. The second welded portions 60 are set on both sides in the vehicle-height direction with respect to each first welded portion 56, and are defined as spots formed when spot-welding is performed in a state in which the pillar outer rear flange 44 and the pillar inner rear flange 54 overlap each other. The second welded portion 60 is formed by partially heating and melting the pillar outer rear flange 44 and the pillar inner rear flange 54, and further cooing and hardening them. That is, in the present embodiment, the pillar outer rear flange 44 and the pillar inner rear flange 54 are integrally joined to each other through the first welded portions 56 and the second welded portions 60.

Meanwhile, as shown in FIG. 3, a third welded portion 62 on the vehicle upper side is set between each first welded portion 56 and the second welded portion 60 located on the vehicle upper side relative to the first welded portion 56; and a third welded portion 62 on the vehicle lower side is set between each first welded portion 56 and the second welded portion 60 located on the vehicle lower side relative to the first welded portion 56. These third welded portions 62 are formed by, for example, performing laser-welding from the outer side in the vehicle width direction of the SM outer rear flange 28 in a state in which the pillar outer rear flange 44 and the SM outer rear flange 28 overlap each other. Each third welded portion 62 is formed by partially heating and melting the SM outer rear flange 28 and the pillar outer rear flange 44, and further cooling and hardening them. That is, in the present embodiment, the pillar outer rear flange 44 and the SM outer rear flange 28 are integrally joined to each other at the first welded portions 56 and the third welded portions 62.

In addition, the arrangement relationship and the welding relationship among the SM outer front flange 24 of the SM outer intermediate portion, the pillar outer front flange 40 of the pillar outer 32, wand the pillar inner front flange 50 of the pillar inner 34 are the same as the arrangement relationship and the welding relationship among the SM outer rear flange 28 of the SM outer intermediate portion, the pillar outer rear flange 44 of the pillar outer 32, the pillar inner rear flange 54 of the pillar inner 34; thus, description thereof will be omitted.

Operation and Effect of First Embodiment

For example, when another vehicle collides against the vehicle 10 to which the present embodiment as above configured is applied from the outer side in the vehicle width direction (that is, when a side collision occurs), a collision load from the outer side in the vehicle width direction is input to the SM outer 12 and the B pillar 30. When such a collision load is input to the B pillar 30, an input portion of the B pillar 30 to which the collision load is input tends to bend inward in the vehicle width direction with respect to both side parts in the vehicle-height direction of the B pillar 30. As a result, a tensile load F in the vehicle-height direction (see FIG. 3) acts on the B pillar 30 between the input portion of the B pillar 30 to which the collision load is input and both side parts in the vehicle-height direction of the B pillar 30.

As described above, when spot-welding is performed on each first welded portion 56, the heat affected zone 58 is formed around the first welded portion 56. The portion in the heat affected zone 58 of the pillar outer rear flange 44 has a lower tensile strength than that of the base material forming the pillar outer 32. Hence, if the tensile load F is concentrated on the portion in the heat affected zone 58 of the pillar outer rear flange 44, the pillar outer rear flange 44 may be deformed and broken at the portion, in the heat affected zone 58 of the pillar outer rear flange 44.

Here, in the present embodiment, the third welded portions 62 are set between each first welded portion 56 and the second welded portions 60. In these third welded portions 62, the pillar outer rear flange 44 is joined to the SM outer rear flange 28.

Therefore, the tensile load F, acting on the pillar outer rear flange 44 at a position relatively more vehicle-upward than the third welded portion 62 on the vehicle upper side, pulls the pillar outer rear flange 44 toward the vehicle upper side and also pulls the SM outer rear flange 28 toward the vehicle upper side at the third welded portion 62 on the vehicle upper side. That is, as shown in FIG. 3, the tensile load F acting on the pillar outer rear flange 44 is distributed to a tensile load F1 that pulls the pillar outer rear flange 44 on the side closer to the first welded portion 56 than to the third welded portion 62, and a tensile load F2 that pulls the SM outer rear flange 28 on the side closer to the first welded portion 56 than to the third welded portion 62.

Similarly, the tensile load F, acting on the pillar outer rear flange 44 at a position relatively more vehicle-downward than the third welded portion 62 on the vehicle lower side, is also distributed to a tensile load F1 that pulls the pillar outer rear flange 44 on the side closer to the first welded portion 56 than to the third welded portion 62, and a tensile load F2 that pulls the SM outer rear flange 28 on the side closer to the first welded portion 56 than to the third welded portion 62.

By distributing the tensile load F in this manner, the tensile load F1 acting on the pillar outer rear flange 44 in the heat affected zone 58 around the first welded portion 56 is reduced. Accordingly, it is possible to suppress occurrence of local deformation of the pillar outer rear flange 44 in the heat affected zone 58 due to the tensile load F acting on the pillar outer rear flange 44, and also suppress occurrence of breakage or the like of the pillar outer rear flange 44 due to this local deformation. Since such occurrence of breakage or the like of the pillar outer rear flange 44 can be suppressed, it is possible to reduce breakage of the B pillar 30 as well as suppress occurrence of a cross-sectional collapse of the B pillar 30.

Accordingly, the performance of the B pillar 30 such as transmission of a collision load by the B pillar 30 and absorption of the collision load by deformation of the B pillar 30 can be fully utilized, to thereby enhance the performance of the B pillar 30 against a side collision. In addition, since the performance of the B pillar 30 with respect to a side collision can be enhanced as described above, reduction in plate thickness of the pillar outer 32 and the pillar inner 34 can be attained; thus, it as possible to attain reduction in weight and cost of the vehicle 10.

In the present embodiment, the welding at the first welded portions 56 and the second welded portions 60 is carried out by spot-welding, but the welding of at least one of the first welded portions 56 and the second welded portions 60 may be carried out by other welding, such as laser-welding and arc-welding. In the present embodiment, the welding at the third welded portions 62 is carried out by laser-welding, but the welding at the third welded portions 62 may be carried out by other welding such as spot-welding and arc-welding.

Configuration of Second Embodiment

Next, the second embodiment will be described.

Figure 4:
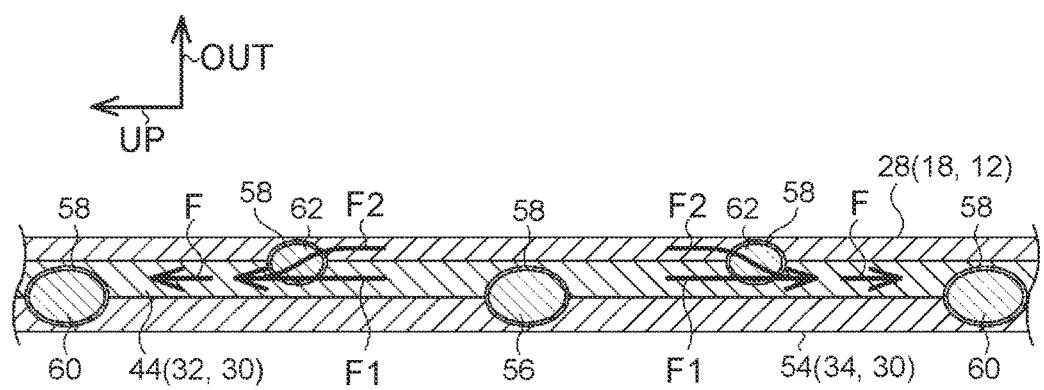
FIG. 4 is a sectional view corresponding to FIG. 3 showing a second embodiment.

As shown in FIG. 4, in the present embodiment, at each first welded portion 56, the pillar outer rear flange 44 of the pillar outer 32 and the pillar inner rear flange 54 of the pillar inner 34 are joined to each other. However, the first welded portion 56 does not reach the SM outer rear flange 28 of the SM outer 12. Therefore, in the present embodiment, the pillar outer rear flange 44 and the SM outer rear flange 28 are not joined to each other at each first welded portion 56. Further, in the present embodiment, the joining between the pillar outer rear flange 44 and the SM outer rear flange 28 at each third welding portion 62 is performed by spot-welding. Moreover, the same applies to the pillar outer front flange 40 of the pillar outer 32, the pillar inner front flange 50 of the pillar inner 34, and the SM outer front flange 24 of the SM outer 12.

Welding Order of Second Embodiment

Next, the welding order of the second embodiment will be described. The following description is provided on the welding of the SM outer rear flange 28 of the SM outer 12, the pillar outer rear flange 44 of the pillar outer 32, and the pillar inner rear flange 54 of the pillar inner 34; and the same applies to the welding of the SM outer front flange 24 of the SM outer 12, the pillar outer front flange 40 of the pillar outer 32, and the pillar inner front flange 50 of the pillar inner 34.

Figure 5:
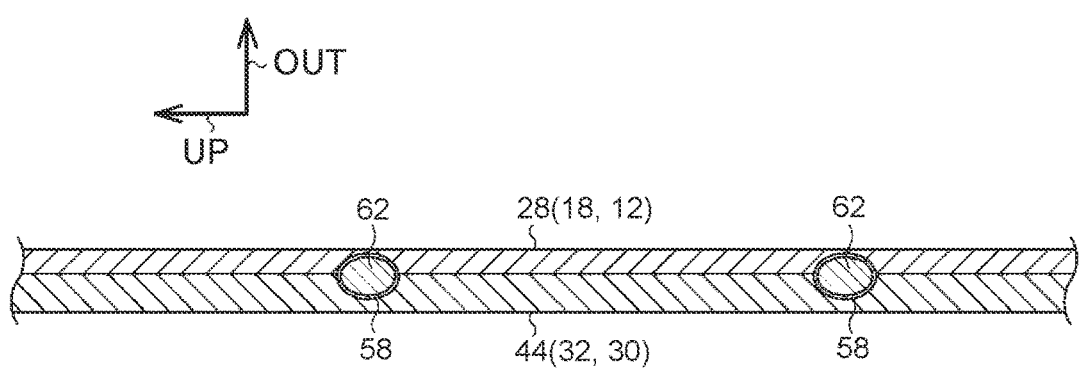
FIG. 5 is a sectional view corresponding to FIG. 4 showing a state in which the SM outer rear flange of the side member outer panel and the pillar outer rear flange of the B pillar are joined to each other.

In the present embodiment, first, the SM outer 12 and the pillar outer 32 are welded to each other in an SM, outer welding process as a third steel plate welding process (see FIG. 5). That is, in the SM outer welding process, portions corresponding to the third welded portions 62 in the pillar outer rear flange 44 of the pillar outer 32 and in the SM outer rear flange 28 of the SM outer 12 are welded to each other by spot-welding.

Next, in a pillar inner welding process as a second steel plate welding process, the pillar inner 34 is welded to the pillar outer 32 welded to the SM outer 12 at the third welded portions 62, at portions corresponding to the first welded portions 56 and the second welded portions 60.

Here, the plate thickness of the SM, outer 12 is set to be smaller than the plate thickness of each of the pillar outer 32 and the pillar inner 34, and the plate thickness of the SM outer 12 is set to be ¼ or smaller of the sum of the plate thickness of the SM outer 12, the plate thickness of the pillar outer 32, and the plate thickness of the pillar inner 34. In addition, in a state in which the SM outer rear flange 28, the pillar outer rear flange 44, and the pillar inner rear flange 54 are stacked in their plate thickness directions, one of the electrodes of the spot-welding is disposed on the opposite side to the pillar outer rear flange 44 of the pillar inner rear flange 54, and the other of the electrodes thereof is disposed on the opposite side to the pillar outer rear flange 44 of the SM outer rear flange 28. In this state, for example, a welding current is supplied from one of the electrodes to the other of the electrodes to perform the spot-welding.

The respective plate thicknesses of the SM outer 12, the pillar outer 32, and the pillar inner 34 are in the above relationship; and if the spot-welding is stopped with a weld nugget extending across the pillar inner rear flange 54 and the pillar outer rear flange 44 being fully formed, the weld nugget does not reach the SM outer rear flange 28. Consequently, at the first welded portions 56 and the second welded portions 60, the pillar outer rear flange 44 and the SM outer rear flange 28 are not welded to each other.

Operation and Effect of Second Embodiment

In the present embodiment in which the SM touter rear flange 28, the pillar outer rear flange 44, and the pillar inner rear flange 54 are welded together in the above-described manner, the pillar outer rear flange 44 is joined to the SM outer rear flange 28 at the third welded portions 62. Accordingly, the present embodiment basically exhibits the same operation as that of the first embodiment and can obtain the same effect as that of the first embodiment.

Further, in the present embodiment, the welding at all the first welded portions 56, the second welded portions 60, and the third welded portions 62 can be performed by spot-welding. Therefore, welding equipment for welding other than the spot-welding, such as laser-welding and arc-welding, is basically unnecessary. This can be realized without causing increase in type of welding equipment and can attain cost reduction.

In addition, the material, the plate thickness, etc., of each of the SM outer 12, the pillar outer 32, and the pillar inner 34 in each of the above embodiments are merely examples, and the material, the plate thickness, etc., of each of the SM outer 12, the pillar outer 32, and the pillar inner 34 are not particularly limited.

In each of the above embodiments, the present disclosure is applied to the relationship between the B pillar 30 and the SM outer 12. However, the present disclosure may be applied to the relationship between the SM carter 2 and the components of the A pillar, and the relationship between the SM outer 12 and the components of a C pillar. The present disclosure may be applied to the relationship among the components of the A pillar, the components of the C pillar, components of a quarter-pillar, components of a rail, components of a rocker, and the respective members of the SM outer 12, in the vicinity of the front opening 14 or the rear opening 16 of the vehicle 10. Furthermore, the present disclosure may be applied to the relationship between skeleton members of the vehicle and other members included in the vehicle body of the vehicle. As described above, the present disclosure can be widely applied to a part in which three or more steel plates are overlapped and at least two of the steel plates are welded together.

What is claimed is:

1. A joining structure of vehicle steel plates, the joining structure comprising:
    a first steel plate;
    a second steel plate disposed to be stacked on the first steel plate on one side in a thickness direction of the first steel plate;
    a third steel plate disposed to be stacked on the first steel plate on the other side in the thickness direction of the first steel plate;
    a first welded portion at which at least the first steel plate and the second steel plate are welded to each other;
    a pair of second welded portions provided on opposite sides of the first welded portion, the first steel plate being welded to only the second steel plate at the pair of second welded portions; and
    a third welded portion provided between the first welded portion and one of the pair of second welded portions, the first steel plate being welded to only the third steel plate at the third welded portion.

2. The joining structure of vehicle steel plates according to claim 1, wherein the first steel plate has a tensile strength of 980 MPa or more.

3. The joining structure of vehicle steel plates according to claim 1, wherein the first welded portion, the pair of second welded portions, and the third welded portion are arranged side by side in a longitudinal direction of the first steel plate and the second steel plate.

4. The joining structure of vehicle steel plates according to claim 3, wherein the first steel plate and the second steel plate configure a vehicle structural member having a closed cross-sectional shape obtained by cutting the first steel plate and the second steel plate along a direction orthogonal to the longitudinal direction of the first steel plate and the second steel plate.

5. A joining method for vehicle steel plates, the joining method comprising:
    a second steel plate welding process that spot-welds a second steel plate disposed on one side in a thickness direction of a first steel plate at a first welded portion, the spot-welding being performed on the first steel plate, and spot-welds the second steel plate at a pair of second welded portions set on opposite sides of the first welded portion, the spot-welding being performed on the first steel plate; and
a third steel plate welding process being performed before the second steel plate welding process, the third steel plate welding process spot-welding a third steel plate disposed on the other side in the thickness direction of the first steel plate at a third welded portion set between the first welded portion and one of the pair of second welded portions, the spot-welding being performed on the first steel plate.

\* \* \* \* \*